US012520979B2

(12) United States Patent
Orchard et al.

(10) Patent No.: US 12,520,979 B2
(45) Date of Patent: Jan. 13, 2026

(54) AUTONOMOUS SURFACE TREATMENT APPARATUS

(71) Applicant: Dyson Technology Limited, Wiltshire (GB)

(72) Inventors: James Murray Orchard, Bath (GB); Christopher Hugo Molesworth Birdwood, Gloucester (GB); Joseph David Evans, Swindon (GB); David Finlay Wyatt, Gloucester (GB)

(73) Assignee: Dyson Technology Limited, Malmesbury (GB)

( * ) Notice: Subject to any disclaimer, the term of this patent is extended or adjusted under 35 U.S.C. 154(b) by 381 days.

(21) Appl. No.: 18/273,519

(22) PCT Filed: Dec. 14, 2021

(86) PCT No.: PCT/GB2021/053274
§ 371 (c)(1),
(2) Date: Jul. 20, 2023

(87) PCT Pub. No.: WO2022/157472
PCT Pub. Date: Jul. 28, 2022

(65) Prior Publication Data

US 2024/0090725 A1 Mar. 21, 2024

(30) Foreign Application Priority Data

Jan. 22, 2021 (GB) ..................................... 2100850

(51) Int. Cl.
*A47L 9/28* (2006.01)
*G05D 1/00* (2006.01)
*G05D 1/02* (2020.01)

(52) U.S. Cl.
CPC ........... *A47L 9/2805* (2013.01); *A47L 9/2852* (2013.01); *G05D 1/0227* (2013.01); *A47L 2201/00* (2013.01)

(58) Field of Classification Search
CPC ...... A47L 9/2805; A47L 9/2852; A47L 9/009; G05D 1/0227
See application file for complete search history.

(56) References Cited

U.S. PATENT DOCUMENTS 5,199,996 A 4/1993 Jonas et al.
D343,707 S 1/1994 Dyson
(Continued)

FOREIGN PATENT DOCUMENTS

AU 2015230722 A1 10/2015
CN 201623207 U 11/2010
(Continued)

OTHER PUBLICATIONS

International Search Report and Written Opinion received for PCT Patent Application No. PCT/GB2021/053270, mailed on Mar. 23, 2022, 9 pages.
(Continued)

*Primary Examiner* — Marc Carlson
(74) *Attorney, Agent, or Firm* — Tucker Ellis LLP; Michael G. Craig

(57) ABSTRACT

An autonomous surface cleaning apparatus includes a body including a chassis and an outer shell mounted to the chassis, a drive system carried by the body, a cleaning assembly projecting forward beyond a front surface of the outer shell, the cleaning assembly having a generally planar front surface, and a forward bumper mounted to the front surface of the cleaning assembly. The apparatus further includes a plurality of forwardmost contact sensors disposed behind the forward bumper and arranged to detect displacement of the
(Continued)

forward bumper relative to the cleaning assembly, a first plurality of shell contact sensors each being arranged to detect longitudinal displacement of the outer shell relative, and a second plurality of shell contact sensors each being arranged to detect lateral displacement of the outer shell relative to both the chassis and the cleaning assembly.

15 Claims, 8 Drawing Sheets

(56) References Cited

U.S. PATENT DOCUMENTS

| | | | |
|---|---|---|---|
| 5,534,762 | A | 7/1996 | Kim |
| 5,903,124 | A | 5/1999 | Kawakami |
| 5,991,951 | A | 11/1999 | Kubo et al. |
| 5,995,883 | A | 11/1999 | Nishikado |
| 5,995,884 | A | 11/1999 | Allen et al. |
| 7,429,843 | B2 | 9/2008 | Jones et al. |
| 7,463,007 | B2 | 12/2008 | Phillips et al. |
| 7,474,941 | B2 | 1/2009 | Kim et al. |
| 7,605,562 | B2 | 10/2009 | Kim |
| 7,611,553 | B2 | 11/2009 | Hato |
| 7,637,335 | B2 | 12/2009 | Hayashi |
| 7,660,650 | B2 | 2/2010 | Kawagoe et al. |
| 7,673,367 | B2 | 3/2010 | Kim et al. |
| 7,856,291 | B2 | 12/2010 | Jung et al. |
| 8,311,674 | B2 | 11/2012 | Abramson |
| 8,744,628 | B2 | 6/2014 | Tang |
| 8,752,240 | B2 | 6/2014 | Pruiett |
| 9,078,552 | B2 | 7/2015 | Han et al. |
| 9,144,357 | B2 | 9/2015 | Vennegoor Op Nijhuis et al. |
| 9,173,539 | B2 | 11/2015 | Yoon et al. |
| 9,346,426 | B2 | 5/2016 | Hickey et al. |
| 9,483,055 | B2 | 11/2016 | Johnson et al. |
| 9,756,997 | B2 | 9/2017 | Maoro et al. |
| 9,999,328 | B2 * | 6/2018 | Vanderstegen-Drake .................. A47L 5/30 |
| 10,130,233 | B2 | 11/2018 | Jang et al. |
| 10,156,083 | B2 | 12/2018 | Ortiz et al. |
| 10,231,591 | B2 | 3/2019 | Wennerstrom et al. |
| 10,357,137 | B2 | 7/2019 | Holz |
| 10,398,273 | B2 | 9/2019 | Watanabe et al. |
| 10,456,002 | B2 | 10/2019 | Amaral et al. |
| 11,104,006 | B2 | 8/2021 | Fay et al. |
| 2001/0049049 | A1 | 12/2001 | Hensley et al. |
| 2002/0092125 | A1 | 7/2002 | Vystrcil et al. |
| 2005/0165508 | A1 | 7/2005 | Kanda et al. |
| 2005/0183229 | A1 | 8/2005 | Uehigashi |
| 2007/0113373 | A1 | 5/2007 | Hato et al. |
| 2008/0141485 | A1 | 6/2008 | Kim et al. |
| 2009/0164123 | A1 | 6/2009 | Moriguchi |
| 2010/0133022 | A1 | 6/2010 | Chung et al. |
| 2010/0235000 | A1 * | 9/2010 | Hsu ........................ B25J 13/081 901/1 |
| 2011/0140829 | A1 | 6/2011 | Veenstra |
| 2011/0197389 | A1 | 8/2011 | Ota et al. |
| 2012/0159736 | A1 | 6/2012 | Huber et al. |
| 2013/0061417 | A1 | 3/2013 | Vanderstegen-Drake et al. |
| 2013/0061420 | A1 | 3/2013 | Vanderstegen-Drake et al. |
| 2013/0241217 | A1 | 9/2013 | Hickey et al. |
| 2014/0013538 | A1 * | 1/2014 | Dyson .................. A47L 9/1625 15/353 |
| 2014/0188325 | A1 | 7/2014 | Johnson et al. |
| 2015/0010782 | A1 | 1/2015 | Tanigaki et al. |
| 2015/0134144 | A1 | 5/2015 | Bron et al. |
| 2015/0136504 | A1 | 5/2015 | Tsujimura et al. |
| 2015/0143646 | A1 | 5/2015 | Jeong et al. |
| 2016/0095487 | A1 | 4/2016 | Koura et al. |
| 2016/0150934 | A1 | 6/2016 | Kim et al. |
| 2017/0102709 | A1 * | 4/2017 | Kwak .................. A47L 9/2805 |
| 2017/0112344 | A1 | 4/2017 | Koura et al. |
| 2017/0332870 | A1 | 11/2017 | Nam et al. |
| 2018/0078106 | A1 | 3/2018 | Scholten et al. |
| 2018/0098678 | A1 | 4/2018 | Chao |
| 2018/0169863 | A1 | 6/2018 | Bushman et al. |
| 2018/0192837 | A1 | 7/2018 | Isenberg et al. |
| 2018/0263447 | A1 * | 9/2018 | Yim ........................ A47L 9/009 |
| 2018/0370042 | A1 | 12/2018 | Fay et al. |
| 2020/0253445 | A1 * | 8/2020 | So ........................ A47L 9/0411 |
| 2020/0405115 | A1 | 12/2020 | Furuta et al. |
| 2021/0228047 | A1 | 7/2021 | Lpez et al. |

FOREIGN PATENT DOCUMENTS

| | | | | | |
|---|---|---|---|---|---|
| CN | 203861128 | U | | 10/2014 | |
| CN | 104007765 | B | | 5/2016 | |
| CN | 105873488 | A | | 8/2016 | |
| CN | 106725103 | A | | 5/2017 | |
| DE | 102007060750 | A1 | | 6/2009 | |
| DE | 102016110817 | A1 | | 12/2017 | |
| EP | 1935308 | A2 | | 6/2008 | |
| EP | 2402193 | A1 | | 1/2012 | |
| EP | 2819235 | B1 | | 4/2016 | |
| EP | 3078315 | A1 | | 10/2016 | |
| EP | 3459415 | A1 | | 3/2019 | |
| GB | 2361100 | B | | 5/2003 | |
| GB | 2432301 | A | | 5/2007 | |
| GB | 2487775 | A | | 8/2012 | |
| GB | 2494446 | A | | 3/2013 | |
| GB | 2494447 | A | | 3/2013 | |
| GB | 2565480 | A | | 2/2019 | |
| GB | 2574417 | A | | 12/2019 | |
| GB | 2574418 | A | | 12/2019 | |
| JP | S63-47806 | A | | 2/1988 | |
| JP | 01-209038 | A | | 8/1989 | |
| JP | H02241423 | A | | 9/1990 | |
| JP | 07-155273 | A | | 6/1995 | |
| JP | H09319434 | A | | 12/1997 | |
| JP | 2003-050633 | A | | 2/2003 | |
| JP | 2003038402 | A | | 2/2003 | |
| JP | 2003325406 | A | | 11/2003 | |
| JP | 2005006857 | A | | 1/2005 | |
| JP | 2005148889 | A | | 6/2005 | |
| JP | 2005211362 | A | | 8/2005 | |
| JP | 2006079145 | A | * | 3/2006 | |
| JP | 2006209644 | A | | 8/2006 | |
| JP | 2007185228 | A | | 7/2007 | |
| JP | 2008279066 | A | | 11/2008 | |
| JP | 2011079411 | A | | 4/2011 | |
| JP | 2012075932 | A | * | 4/2012 | .......... A47L 11/4027 |
| JP | 2012209096 | A | | 10/2012 | |
| JP | 2013233305 | A | | 11/2013 | |
| JP | 2015-043136 | A | | 3/2015 | |
| JP | 2015104563 | A | | 6/2015 | |
| JP | 6302695 | A | | 8/2015 | |
| JP | 6360599 | B2 | | 7/2018 | |
| JP | 6539504 | A | | 7/2019 | |
| KR | 970000578 | B1 | | 7/1998 | |
| KR | 20030083524 | A | | 10/2003 | |
| KR | 20030083525 | A | | 10/2003 | |
| KR | 20050063544 | A | | 6/2005 | |
| KR | 20060015435 | A | | 2/2006 | |
| KR | 20060064330 | A | | 6/2006 | |
| KR | 20070007011 | A | | 1/2007 | |
| KR | 20070107956 | A | | 11/2007 | |
| KR | 20070111014 | A | | 11/2007 | |
| KR | 20080051942 | A | | 6/2008 | |
| KR | 20090018287 | A | | 2/2009 | |
| KR | 20090057160 | A | | 6/2009 | |
| KR | 10-1021268 | B1 | | 3/2011 | |
| KR | 10-2014-0082219 | A | | 7/2014 | |
| KR | 20140082219 | A | | 7/2014 | |
| KR | 20160003435 | A | | 1/2016 | |
| KR | 10-2018-0089932 | A | | 8/2018 | |
| KR | 20210004683 | A | | 1/2021 | |
| WO | 00/38255 | A1 | | 6/2000 | |
| WO | 2005077240 | A | | 8/2005 | |
| WO | 2011000826 | A1 | | 1/2011 | |
| WO | 2013/125992 | A1 | | 8/2013 | |
| WO | 2015/082017 | A1 | | 6/2015 | |
| WO | 2015090438 | A1 | | 6/2015 | |
| WO | 2016/021808 | A1 | | 2/2016 | |

(56) References Cited

FOREIGN PATENT DOCUMENTS

| | | | |
|---|---|---|---|
| WO | 2018/125222 | A1 | 7/2018 |
| WO | 2019/164648 | A1 | 8/2019 |
| WO | 2019181182 | A1 | 9/2019 |

OTHER PUBLICATIONS

International Search Report and Written Opinion received for PCT Patent Application No. PCT/GB2021/053272, mailed on Mar. 25, 2022, 7 pages.
International Search Report and Written Opinion received for PCT Patent Application No. PCT/GB2021/053273, mailed on Mar. 16, 2022, 8 pages.
International Search Report and Written Opinion received for PCT Patent Application No. PCT/GB2021/053274, mailed on Mar. 24, 2022, 9 pages.
International Search Report and Written Opinion received for PCT Patent Application No. PCT/GB2021/053275, mailed on Mar. 16, 2022, 9 pages.
International Search Report and Written Opinion received for PCT Patent Application No. PCT/GB2021/053276, mailed on May 19, 2022, 16 pages.

* cited by examiner

AUTONOMOUS SURFACE TREATMENT APPARATUS

CROSS-REFERENCE TO PRIOR APPLICATION

This application is a § 371 National Stage Application of PCT International Application No. PCT/GB2021/053274 filed Dec. 14, 2021, which claims the priority of United Kingdom Application No. 2100850.3, filed Jan. 22, 2021, each of which are herein incorporated by reference in their entirety.

FIELD OF THE INVENTION

The present invention relates to the field of autonomous surface cleaning apparatus. More specifically, it relates to a robotic vacuum cleaner.

BACKGROUND OF THE INVENTION

Various proposals have been made in respect of autonomous surface cleaning apparatus, which are driven automatically and do not require to be propelled by a user across a surface to be cleaned. Essentially, such an apparatus comprises a body or chassis supported on wheels or tracks which are driven by an on-board battery pack and guided by a control system which navigates the apparatus around a room so that the floor or floor covering can be cleaned. For cleaning, such an apparatus typically also incorporates a cleaner head having a suction opening communicating with a dirt or dust collection device so that dirt and dust can be sucked up from the surface to be cleaned and stored in a receptacle for disposal.

The designs of such autonomous surface cleaning apparatus vary significantly depending upon the functions that are prioritized. For example, most designs prioritize manoeuvrability and navigation and the number and arrangement of the sensors used by the apparatus to navigate an environment are therefore a key aspect of their design.

It is an object of the present invention to provide an autonomous surface cleaning apparatus whose general arrangement has been optimised for both manoeuvrability and for the performance of cleaning operations, and in which the configuration of the navigation sensors are optimised for this arrangement.

SUMMARY OF THE INVENTION

According a first aspect there is provided an autonomous surface cleaning apparatus. The apparatus comprises a body comprising a chassis and an outer shell mounted to the chassis, a drive system carried by the body and configured to move the autonomous surface cleaning apparatus across a surface, a cleaning assembly disposed at a front of the body and projecting forward beyond a front surface of the outer shell, the cleaning assembly having a generally planar front surface, and a forward bumper mounted to the front surface of the cleaning assembly. The apparatus further comprises a plurality of forwardmost contact sensors disposed behind the forward bumper, each forwardmost contact sensor being arranged to detect displacement of the forward bumper relative to the cleaning assembly, a first plurality of shell contact sensors disposed behind the outer shell, each of the first plurality of shell contact sensors being arranged to detect longitudinal displacement of the outer shell relative to the chassis, and a second plurality of shell contact sensors disposed behind the outer shell, each of the second plurality of shell contact sensors being arranged to detect lateral displacement of the outer shell relative to both the chassis and the cleaning assembly.

Preferably, the outer shell is arranged to be displaceable relative to the chassis in the longitudinal and lateral directions of the autonomous surface cleaning apparatus in response to a force applied thereto.

The apparatus may further comprise a first biasing assembly arranged to apply a restoring force to the outer shell following a lateral displacement of the outer shell in order to return the outer shell to its initial lateral position with respect to the chassis. The apparatus may further comprise a second biasing assembly arranged to apply a restoring force to the outer shell following a longitudinal displacement of the outer shell in order to return the outer shell to its initial longitudinal lateral position with respect to the chassis.

Preferably the front surface of the outer shell is disposed above the cleaning assembly. The cleaning assembly may therefore be disposed lower than the front surface of the outer shell. The outer shell defines side surfaces that extend rearward from opposite ends of the front surface. The side surfaces may each have a frontmost portion that is generally planar and a rearmost portion that is curved, with the rearmost portions curving inwardly toward one another. The frontmost portions of the side surfaces of the outer shell may be substantially perpendicular to the front surface of the outer shell.

Preferably, the first plurality of shell contact sensors are disposed behind the front surface of the outer shell and are each arranged to detect longitudinal displacement of the front surface of the outer shell toward the chassis. The first plurality of shell contact sensors may comprise a front left shell contact sensor disposed adjacent to a front left corner of the outer shell and a front right shell contact sensor disposed adjacent to a front right corner of the outer shell.

Preferably, the second plurality of shell contact sensors comprise at least one shell contact sensor disposed behind a first side surface of the outer shell and at least one shell contact sensor disposed behind a second side surface of the outer shell. The second plurality of shell contact sensors may comprise a first side shell contact sensor mounted to a first side of the cleaning assembly that is arranged to detect lateral displacement of the first side surface of the outer shell towards the cleaning assembly and a second side shell contact sensor mounted to a second side of the cleaning assembly that is arranged to detect lateral displacement of the second side surface of the outer shell towards the cleaning assembly. The first side surface of the outer shell may then extend at least partially over the first side of the cleaning assembly and the second side surface of the outer shell extend at least partially over the second side of the cleaning assembly.

Preferably, the forward bumper is arranged to be displaceable relative to the cleaning assembly in response to a force applied thereto. The forward bumper may comprise a plurality of rigid segments collectively arranged to extend laterally along the front surface of the cleaning assembly, the forward bumper being configured such that each of the plurality of rigid segments is displaceable relative to the other of the plurality of rigid segments in response to a force applied thereto. The plurality of rigid segments may be connected by flexible joints, and preferably by resilient flexible joints. Preferably, the flexible joints are living hinges. The plurality of forwardmost contact sensors may then comprise a forwardmost contact sensor disposed beneath each of the plurality of rigid segments, each forwardmost contact sensor being arranged to detect displacement of a respective rigid segment of the forward bumper. The plurality of rigid segments may further comprise a projection extending inwardly from the forward bumper, each projection being arranged to contact the respective forwardmost contact sensor when the respective rigid segment is displaced longitudinally towards the body of the apparatus.

Preferably, the forward bumper extends over first and second front corners of the cleaning assembly. A first end rigid segment of the bumper may then extend around a first front corner of the cleaning assembly and may be arranged to be displaced by a force applied to a first front corner of the bumper, and a second end rigid segment of the bumper may extend around a second front corner of the cleaning assembly and may be arranged to be displaced by a force applied to a second front corner of the bumper.

The cleaning assembly may comprises first and second side surfaces that extend rearward from opposite ends of the front surface of the cleaning assembly. The first and second side surfaces of the cleaning assembly are planar and are substantially perpendicular to the front surface of the cleaning assembly, and are therefore parallel to one another. The first front corner of the cleaning assembly is formed where the front surface meets the first side surface and the second front corner of the cleaning assembly is formed where the front surface meets the second side surface.

BRIEF DESCRIPTION OF THE INVENTION

An embodiment of the present invention will now be described, by way of example only, with reference to the accompanying drawings, in which.

DETAILED DESCRIPTION OF THE INVENTION

Figure 1:
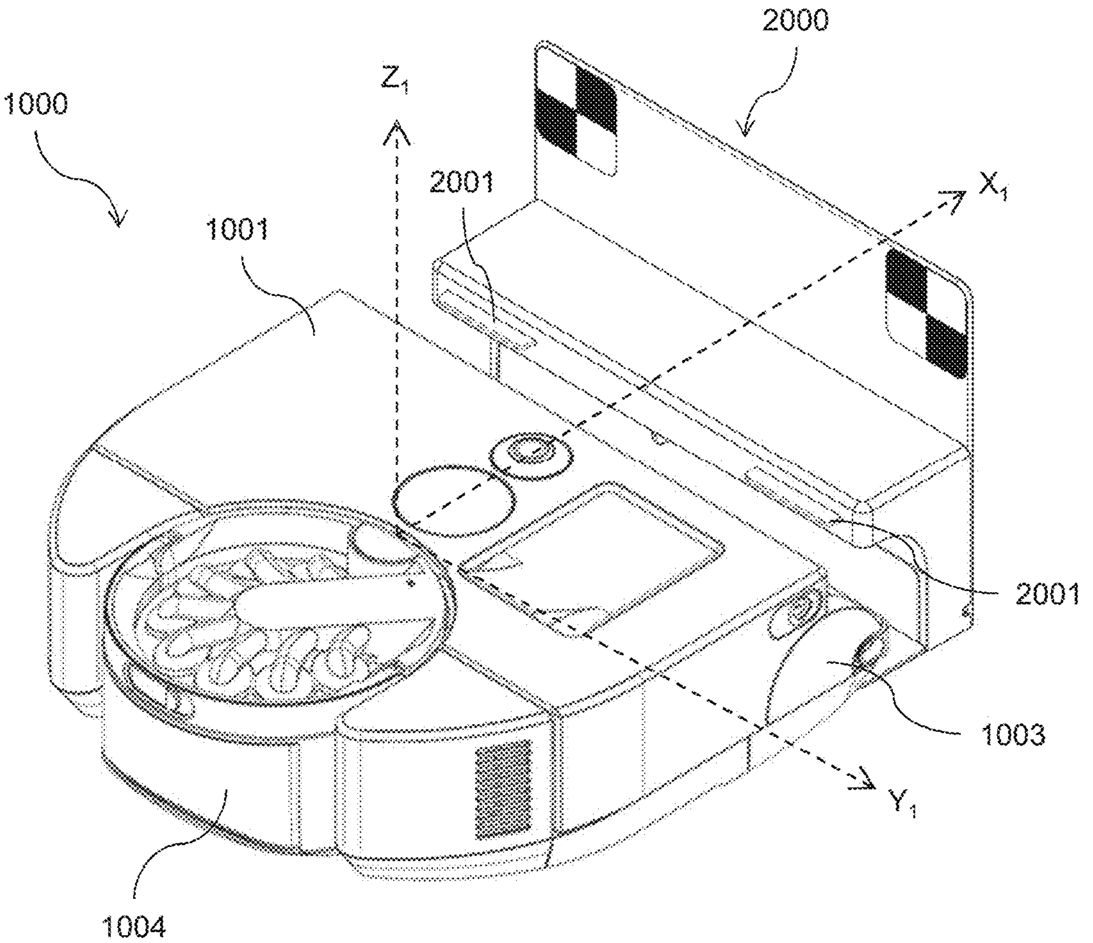
FIG. 1 is a rear perspective view of an autonomous surface cleaning apparatus as described herein approaching an associated docking station.
Figure 2:
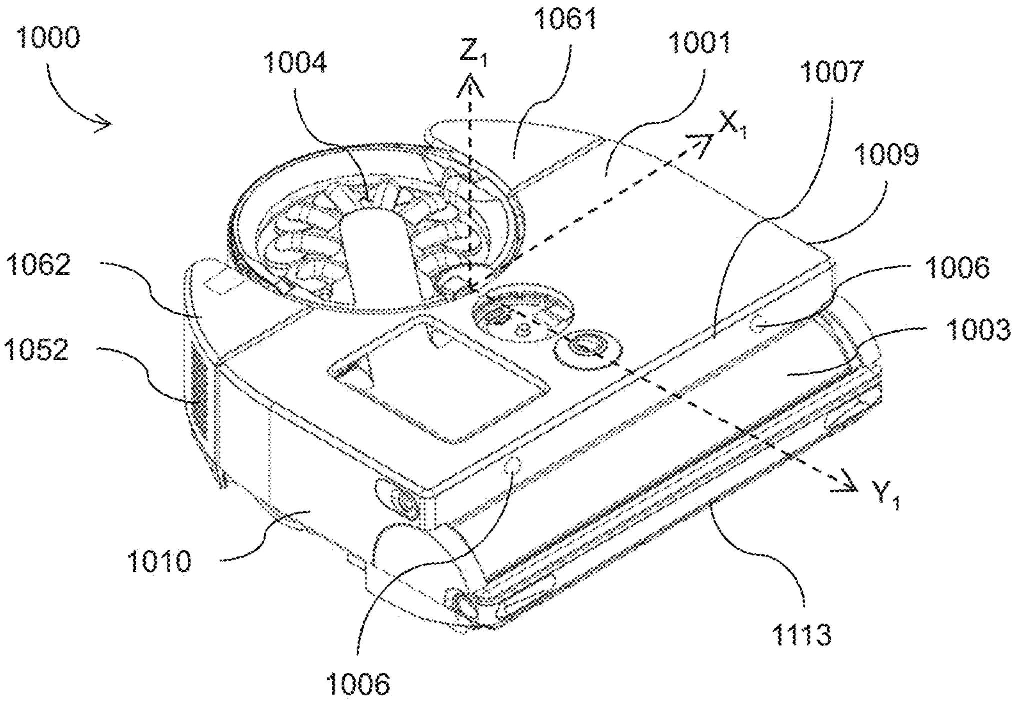
FIG. 2 is a front perspective view of the apparatus of FIG. 1.
Figure 3:
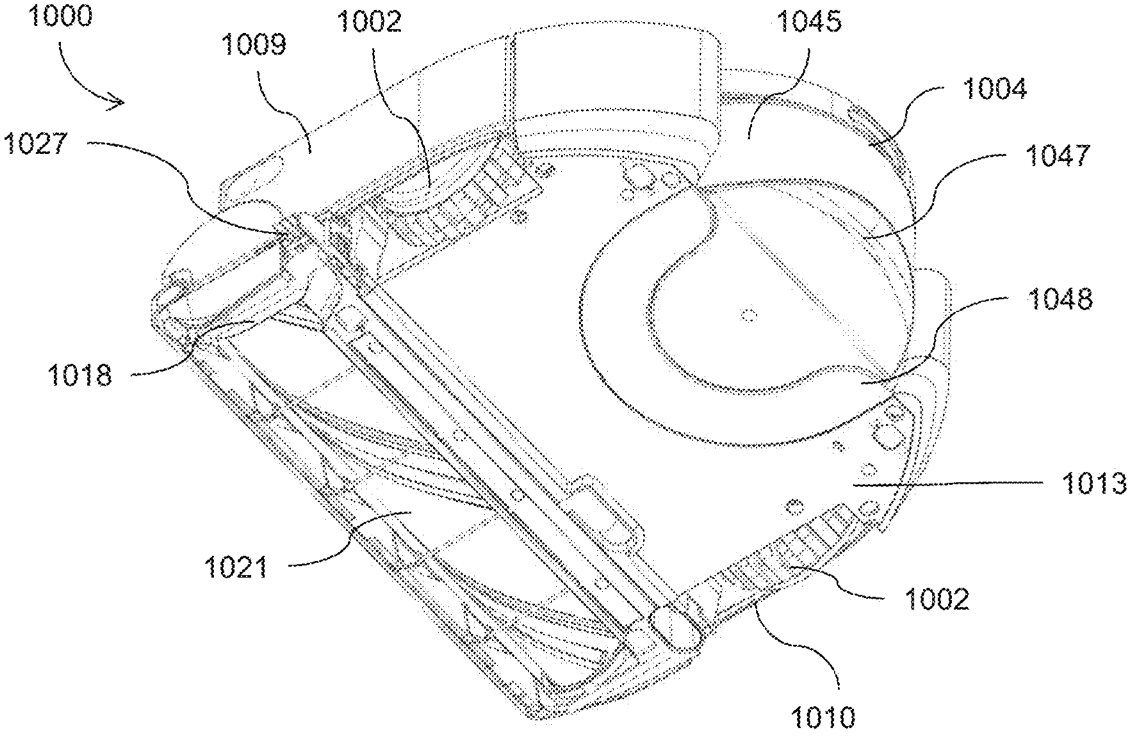
FIG. 3 is a rear perspective view of the underside of the apparatus of FIG. 1.
Figure 4:
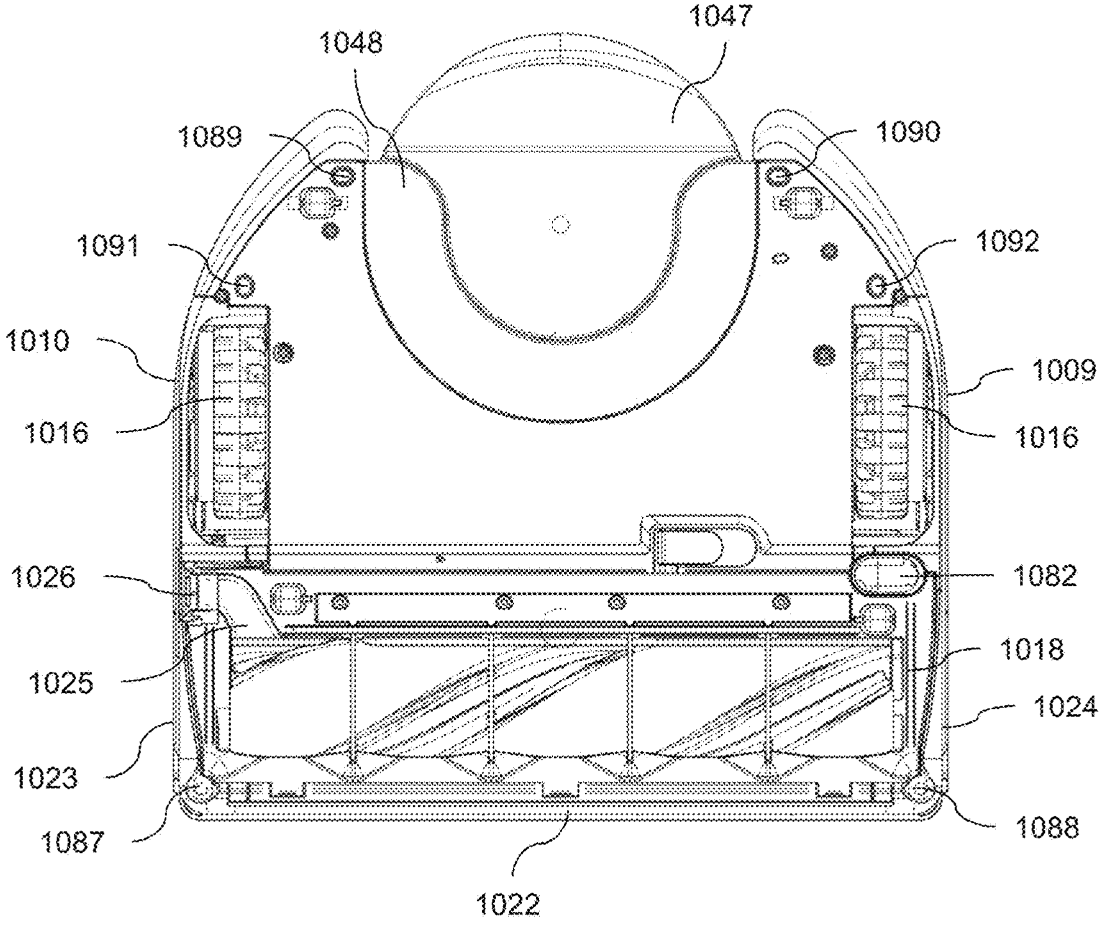
FIG. 4 is a bottom view of the apparatus of FIG. 1.

There will now be described an autonomous surface cleaning apparatus that provides various advantages over conventional autonomous surface cleaning apparatus. FIGS. 1 to 4 are external views of an embodiment of such an autonomous surface cleaning apparatus 1000 (hereinafter "the apparatus 1000"). In this embodiment, the apparatus 1000 is shown in the context of a robotic vacuum cleaner, although it should be appreciated that this is not essential to the invention and that the invention is applicable to any autonomous surface cleaning apparatus, in a domestic setting or otherwise. FIG. 1 shows a rear perspective view of the apparatus 1000 approaching an associated docking station 2000, FIG. 2 shows a front perspective view of the apparatus 1000, FIG. 3 shows a rear perspective view of the bottom of apparatus 1000, and FIG. 4 shows a bottom view of the apparatus 1000.

As shown in FIG. 1, the apparatus 1000 has a longitudinal axis ($X_1$) that extends between the front and the rear of the apparatus 100, a transverse axis ($Y_1$) that extends in the lateral direction between the left (L) and right (R) sides of the apparatus 1000, and a vertical axis ($Z_1$) that extends substantially vertically relative to the surface on which the apparatus 1000 travels. For the purpose of this description, terms such as 'front' and 'rear', in the context of the apparatus 1000, are used in the sense of its forward and reverse directions during operation. Similarly, the terms 'left' and 'right' will be used with reference to the direction of forward movement of the apparatus 1000.

The apparatus 1000 comprises a body 1001, a drive system 1002 carried by the body 1001 and configured to move the autonomous surface cleaning apparatus 1000 across a surface, a cleaning assembly 1003 disposed at a front of the body 1001, and a receptacle 1004 releasably attached to the body 1001 and configured to receive dirt collected by the cleaning assembly 1003. The apparatus 1000 further comprises a rechargeable battery system 1005 carried by the body 1001 and arranged to provide electrical power to the various systems of the apparatus 1000, with battery charging contacts 1006 disposed on a front surface 1007 of the body 1001. The charging contacts 1006 are electrically connected to the rechargeable battery system 1005 and are configured to pass electrical current when in contact with corresponding charging contacts 2001, e.g. provided on a docking station 2000 associated with the autonomous surface cleaning apparatus 1000.

In the illustrated embodiment, the body 1001 defines a generally planar front surface 1007 that is substantially perpendicular to a bottom or base of the body 1001 such that the front surface 1007 is approximately vertical when the apparatus 1000 is supported on a horizontal surface. The body 1001 also defines first and second (i.e. left and right) side surfaces 1009, 1010, at least a portion of which extend rearward from opposite ends of the front surface 1007. The first and second side surfaces 1009, 1010 each have a frontmost portion that is generally planar and a rearmost portion that is curved, with the rearmost portions curving inwardly toward one another and toward the longitudinal axis ($X_1$) of the apparatus 1000. The frontmost portions of the side surfaces 1009, 1010 of the body 1001 are substantially perpendicular to the front surface 107 of the body 1001, and are therefore parallel to one another. The body 1001 of the apparatus 1000 therefore has a plan shape that is generally D-shaped. The term "plan shape" as used herein refers to the outer peripheral shape when viewed from above.

Figure 5:
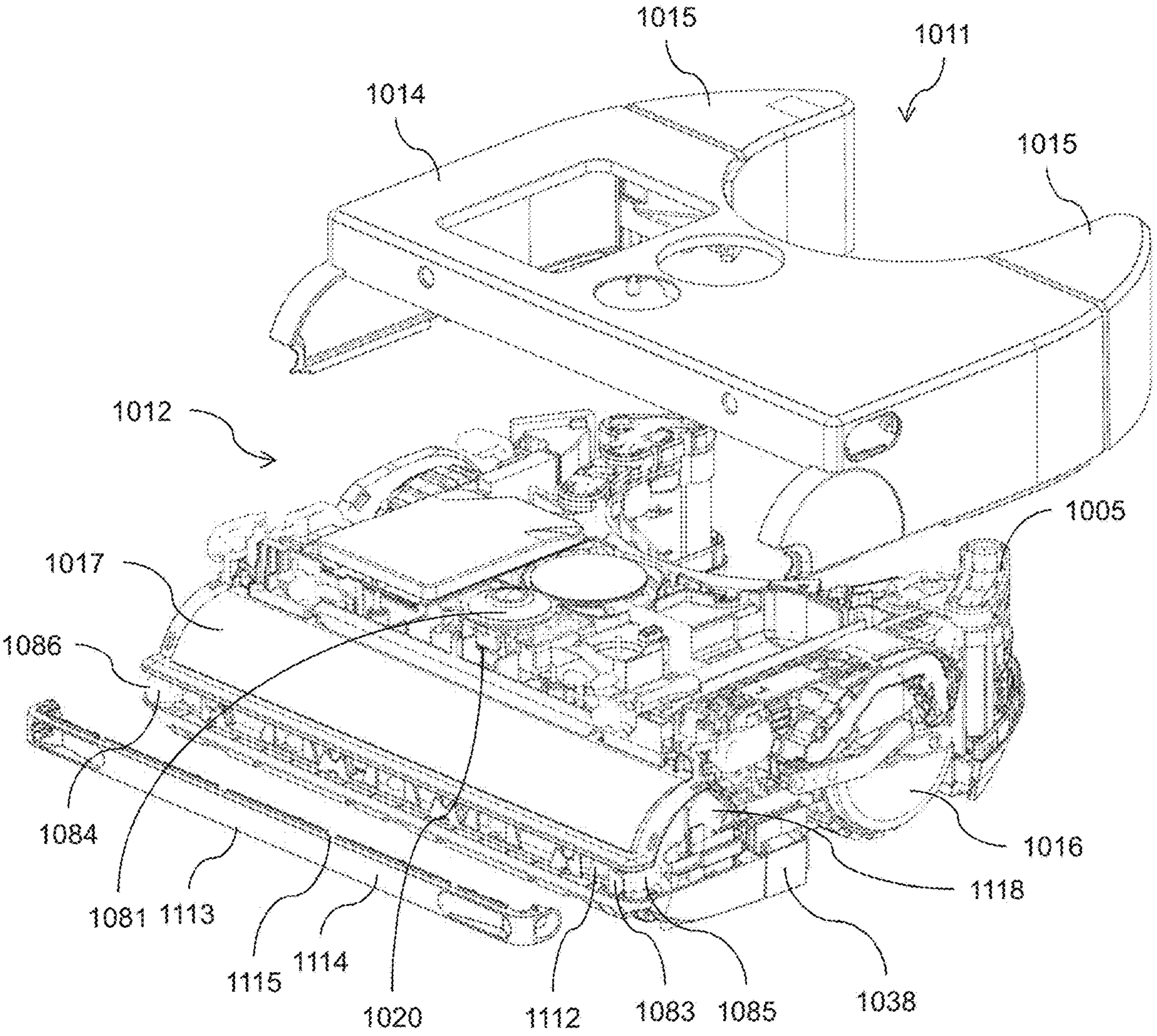
FIG. 5 is a front perspective view of the apparatus of FIG. 1 with an outer shell and bumper separated from the body of the apparatus.

As shown in FIG. 5, the body 1001 of the apparatus 1000 comprises a chassis 1011 and an outer shell 1012 mounted to the chassis 1011. The outer shell 1012 defines the outer surfaces of the body 1001 and comprises one or more covers that are collectively arranged to cover the chassis 1011 and form the exterior surfaces of the body 1001. In the illustrated embodiment, the outer shell 1012 comprises a base cover 1013, a front cover 1014 and a pair of rear covers 1015.

The drive system 1002 is mounted to the chassis 1011 and comprises a pair of differentially drive wheels 1016 that partially project from the bottom of the body 1001. In the illustrated embodiment, the drive system 1002 is disposed approximately midway between a frontmost portion of the apparatus 1000 and a rearmost portion of the apparatus 1000, with first and second (i.e. left and right) drive wheels 1016 disposed adjacent to the respective side surface 1009, 1010.

Figure 6:
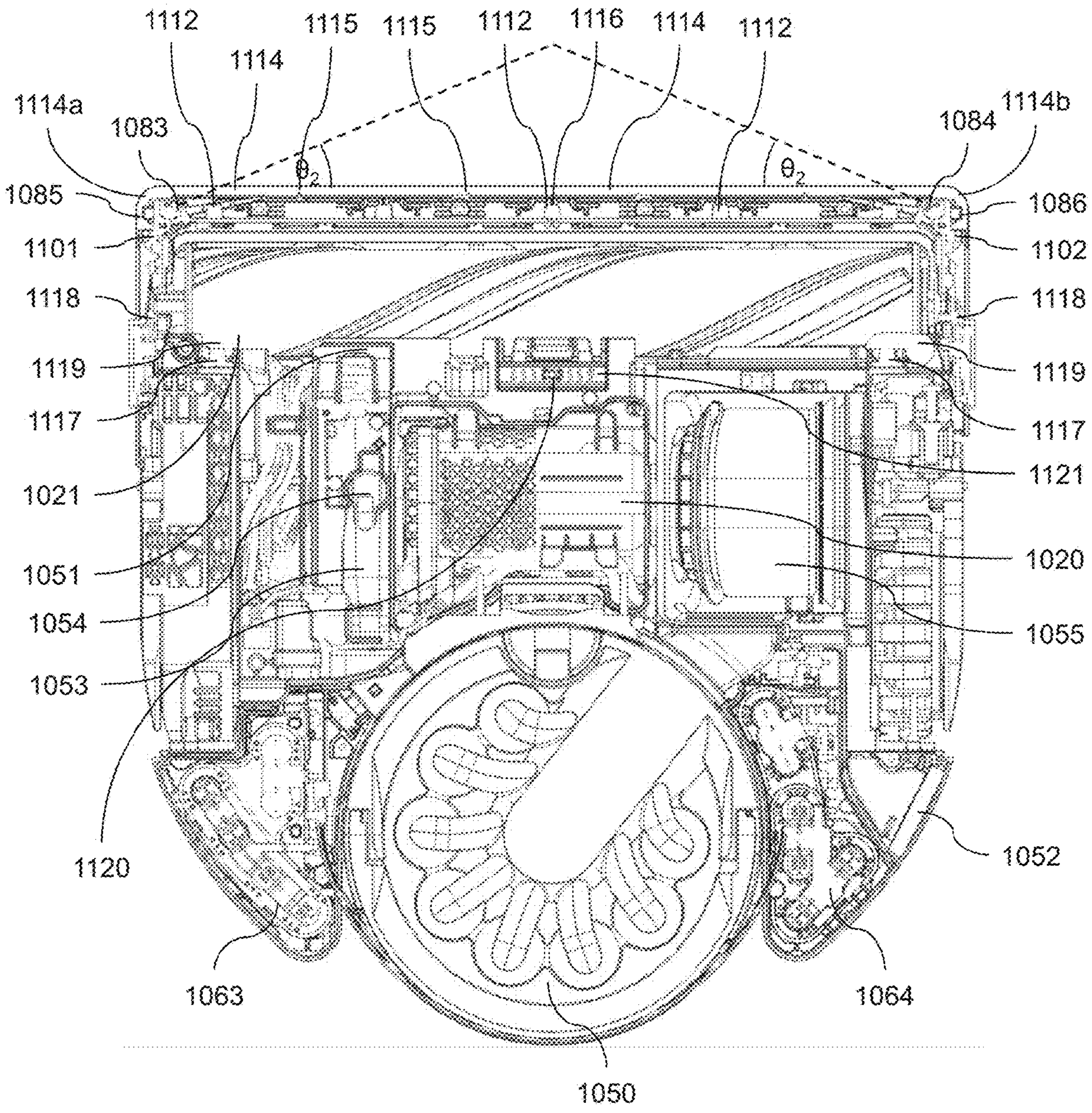
FIG. 6 is a top view of the apparatus of FIG. 1 with an outer shell of the apparatus removed.

The cleaning assembly 1003 is disposed beneath the front surface 1007 of the body 1001 and projects forward of the front surface 1007 of the body 1001. This arrangement provides that the cleaning assembly 1003 is the first part of the apparatus 1000 to pass over a surface to be cleaned and also provides that the cleaning assembly 1003 can reach under low objects where the full height of the apparatus 1000 may not be able to go. In the illustrated embodiment, the cleaning assembly 1003 comprises a housing 1017 defining a suction chamber 1018, the suction chamber 1018 having an opening in a bottom surface of the cleaning assembly such that the opening is adjacent to a surface to be cleaned. As shown in FIG. 6, the apparatus 1000 then further comprises an airflow generator 1020 for creating an airflow through the suction chamber. The airflow generator 1020 comprises an impeller (not shown) that is driven by a vacuum motor (not shown), with the vacuum motor being driven by electrical power received from the rechargeable battery system 1005. An agitator 1021 is also disposed within the suction chamber 1018 and is arranged to move or dislodge dirt from a surface to be cleaned, making it easier to collect through the suction chamber 1018. In the illustrated embodiment, the agitator 1021 is provided by a rotatable brush bar.

The plan shape of the cleaning assembly 1003 is substantially rectangular. The cleaning assembly 1003 therefore has a generally planar front surface 1022 and first and second (i.e. left and right) side surfaces 1023, 1024 that extend rearward from opposite ends of the front surface 1022. As shown in FIG. 3, the housing 1017 of the cleaning assembly 1003 then also defines a suction channel 1025 that extends from the suction chamber 1018 to a suction channel opening 1026 provided in the first side surface 1023 of the cleaning assembly 1003. A side suction nozzle 1027 is then mounted to the housing 1017 adjacent to the suction channel opening 1026. The side suction nozzle 1027 is mounted to the housing 1017 by way of an extension and retraction assembly that is arranged to allow the side suction nozzle 1027 to be moved between an extended position and a retracted position. In the extended position the side suction nozzle 1027 projects away from the suction channel opening 1026 and away from the first side surface 1023 of the cleaning assembly 1003, whilst in the retracted position the side suction nozzle 1027 is retracted within the cleaning assembly 1003 (i.e. behind the first side surface 1023 of the cleaning assembly 1003).

Figure 7:
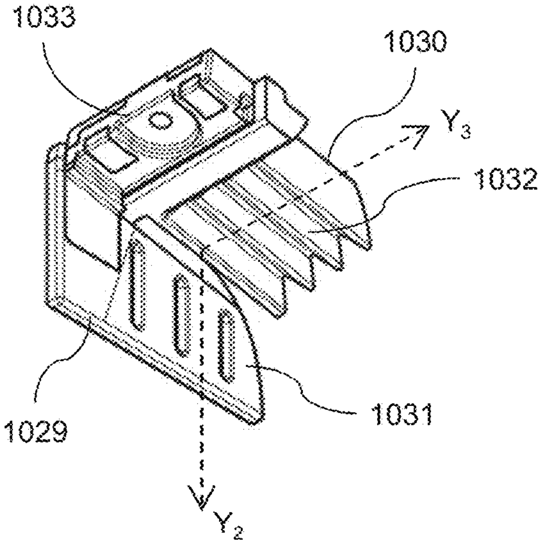
FIG. 7 is a front perspective view of the underside of a suction nozzle of the apparatus of FIG. 1.
Figure 8:
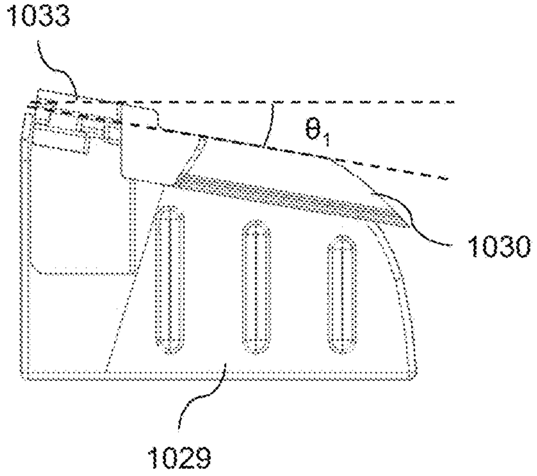
FIG. 8 is a front view of a suction nozzle of the apparatus of FIG. 1.

As shown in FIG. 7 and FIG. 8, the side suction nozzle 1027 comprises a first resilient blade 1029 and a second resilient blade 1030, the first resilient blade 1029 being arranged such that a surface 1031 of the first resilient blade 1029 is substantially forward facing and the second resilient blade 1030 being arranged such that a surface 1032 of the second resilient blade 1030 is substantially downward facing. In this specific embodiment, the first resilient blade 1029 is arranged to be substantially vertical when the apparatus 1000 is supported on a horizontal surface, whilst the second resilient blade 1030 is arranged to be substantially horizontal. The transverse axis ($Y_2$) of the first resilient blade is therefore perpendicular to the transverse axis ($Y_3$) of the second resilient blade. The first resilient blade 1029 and the second resilient blade 1030 each comprise a resilient material such as an elastomer, particularly a resilient plastic or rubber. For example, the first resilient blade 1029 and the second resilient blade 1030 could comprise a resilient material such as thermoplastic polyurethane (TPU). The side suction nozzle 1027 allows the apparatus 1000 to clean close to the edges of vertical surfaces, such as walls, as the apparatus 1000 can be manoeuvred such that the resilient blades 1029, 1030 of the side suction nozzle 1027 contact and swipe along these surfaces to ensure that dirt and debris is directed into cleaning assembly 1003 through the side suction channel 1025.

The first resilient blade 1029 is substantially planar, with a lower edge that is straight and an upper edge that is at least partially curved so as to meet the lower edge at a point (i.e. such that the first resilient blade 1029 has the shape of a straight back blade). In contrast, the second resilient blade 1030 is corrugated and is arranged such that ridges and grooves of the second resilient blade extend from a proximal end or base of the blade to a distal end or tip of the blade. In the illustrated embodiment, the second resilient blade 1030 is arranged to be at an angle ($\theta_1$) of from 0 to 20 degrees below horizontal when the apparatus 1000 is supported on a horizontal surface.

The side suction nozzle 1027 further comprises a nozzle base 1033 to which the first resilient blade 1029 and the second resilient blade 1030 are attached, with the first resilient blade 1029 and the second resilient blade 1030 being connected to the extension and retraction assembly 1028 by way of the nozzle base 1033. In the illustrated embodiment, the first resilient blade 1029, the second resilient blade 1030 and the nozzle base 1033 are integrally formed, with the first resilient blade 1029 only being connected to the second resilient blade 1030 by way of the nozzle base 1033.

As is illustrated in FIG. 3 and FIG. 4, when in the retracted position the first resilient blade 1029 and the second resilient blade 1030 are retracted and retained within the cleaning assembly 1003 such that they do not project away from the first side surface 1023 of the cleaning assembly 1003, and when in the extended position the first resilient blade 1029 and the second resilient blade 1030 extend away from the first side surface 1023 of the cleaning assembly 1003. Specifically, when the side suction nozzle 1027 is in the extended position the first resilient blade 1029 projects away a rearmost edge of the suction channel opening 1026, whilst the second resilient blade 1030 projects away an upper edge of the suction channel opening 1026.

Figure 9:
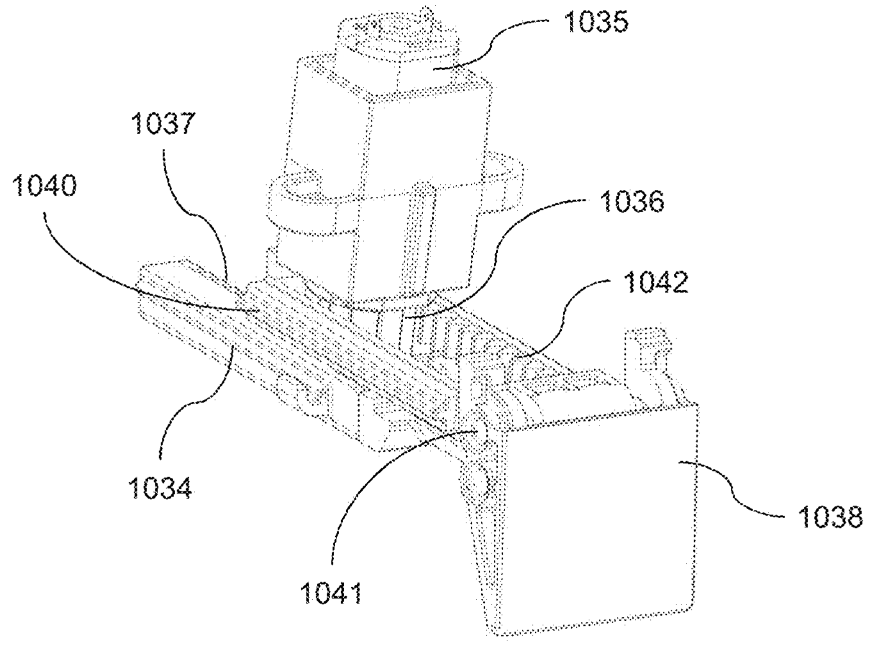
FIG. 9 is a front perspective view of a suction nozzle of the apparatus of FIG. 1 in a retracted position.
Figure 10:
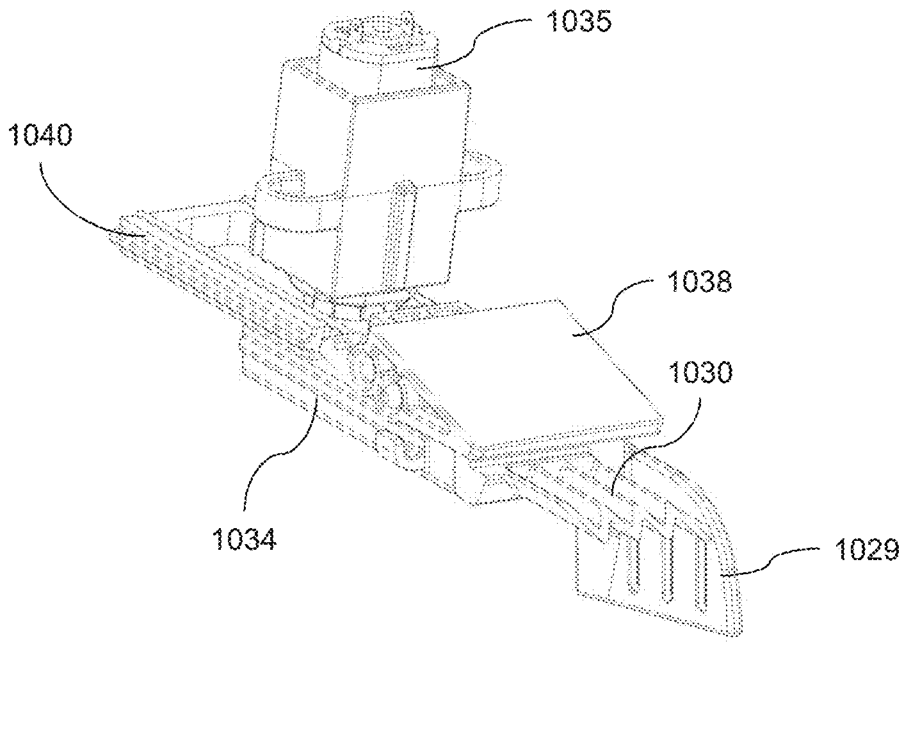
FIG. 10 is a front perspective view of a suction nozzle of the apparatus of FIG. 1 in an extended position.

The extension and retraction assembly is shown in FIG. 9 and FIG. 10 and comprises an extension arm 1034 that is movably connected to the cleaning assembly 1003, with the suction nozzle 1027 being attached to a distal end of the extension arm 1034. The extension arm 1034 is then arranged to move laterally relative to the cleaning assembly 1003 (i.e. towards and away from the first side surface 1023 of the cleaning assembly 1003). To do so, the extension and retraction assembly further comprises a linear actuator that is arranged to move the extension arm 1034 laterally relative to the cleaning assembly 1003. In the illustrated embodiment, the linear actuator comprises a nozzle motor 1035 arranged to drive a drive member 1036 and a driven member

1037 that is arranged to be driven by the drive member 1036 to cause the extension arm 1034 to move laterally relative to the cleaning assembly. Specifically, the drive member 1036 comprises a pinion mounted to a shaft of the nozzle motor 1035 and the driven member 1037 comprises a rack provided on the extension arm 1034 that is arranged to engage with a first side of the pinion.

The cleaning assembly 1003 then further comprises a door 1038 that is arranged to move between a closed position in which the door 1038 covers the suction channel opening 1026 when the suction nozzle 1027 is in the retracted position, and an open position in which the door 1038 does not cover the suction channel opening 1026 when the suction nozzle 1027 is in the extended position. In the illustrated embodiment, the cleaning assembly 1003 comprises a door actuation assembly that is arranged to move the door 1038 between the closed position and the open position. The door actuation assembly comprises a retraction arm 1040 that is movably connected to the cleaning assembly 1003, with the door 1038 being attached to a distal end of the retraction arm 1040 by way of a hinge 1041. The retraction arm 1040 is arranged to move laterally relative to the cleaning assembly 1003 (i.e. towards and away from the first side surface 1023 of the cleaning assembly 1003) and the door 1038 is arranged such that lateral movement of the retraction arm 1040 causes the door 1038 to move between the closed position and the open position. The linear actuator of the extension and retraction assembly is then arranged to move the extension arm 1034 in a first direction and to simultaneously move the retraction arm 1040 in a second direction. To do so, the retraction arm 1040 is provided with a rack 1042 that is arranged to engage with a second side of the pinion 1036, the second side of the pinion 1036 being diametrically opposite to the first side of the pinion 1036.

The autonomous surface cleaning apparatus 1000 further comprises a separation system 1050 configured to separate dirt from an airflow passing through the apparatus 1000 and to deposit dirt into the receptacle 1004. To do so, the separation system 1050 is disposed in the airflow path between an air inlet 1051 provided at the suction chamber 1018 of the cleaning assembly 1003 and an air outlet or exhaust 1052 of the apparatus 1000. In the illustrated embodiment, the separation system 1050 comprises a cyclonic separator that is partially disposed within the receptacle 1004. The apparatus 1000 then comprises an inflow or inlet duct 1053 that extends from the cleaning assembly 1003 to the separation system 1050 within receptacle 1004. The inflow duct 1053 is straight and extends through the body 1001 in a direction that is parallel to the longitudinal axis ($X_1$) of the body 1001. The apparatus 1000 also includes a removable filter assembly 1055 disposed in the airflow path between the separation system 1050 and the air outlet 1052 of the apparatus 1000. In the illustrated embodiment, the removable filter assembly 1055 combines both a pre-motor filter and a post-motor filter into a single unit. The filter assembly 1055 is therefore arranged such that a pre-motor filter of the filter assembly 1055 is disposed in the airflow path between the separation system 1050 and the motor of the airflow generator 1020 and with a post-motor filter of the filter assembly 1055 is disposed in the airflow path between the motor of the airflow generator 1020 and the air outlet 1052 of the apparatus 1000.

In the illustrated embodiment, the apparatus 1000 further comprises a vibration sensor 1054 configured to detect vibrations of the inflow duct 1053 caused by dirt impacting the inflow duct 1053 (i.e. as dirt traverses through the inflow duct 1053 from the cleaning assembly 103 to the separation system 150). The vibration sensor 1054 is disposed adjacent to an outside of an upper surface of the inflow duct 1053. In the illustrated embodiment, the vibration sensor 1054 comprises a piezoelectric sensing element. The vibration sensor 1054 is configured to communicate with a control system of the apparatus 1000 and thereby provide vibration data, with the control system being configured to process the vibration data received from the vibration sensor 1054 to determine one or more of a volume of dirt, a size of dirt pieces, a mass of dirt pieces and a type of dirt pieces etc.

Figure 11:
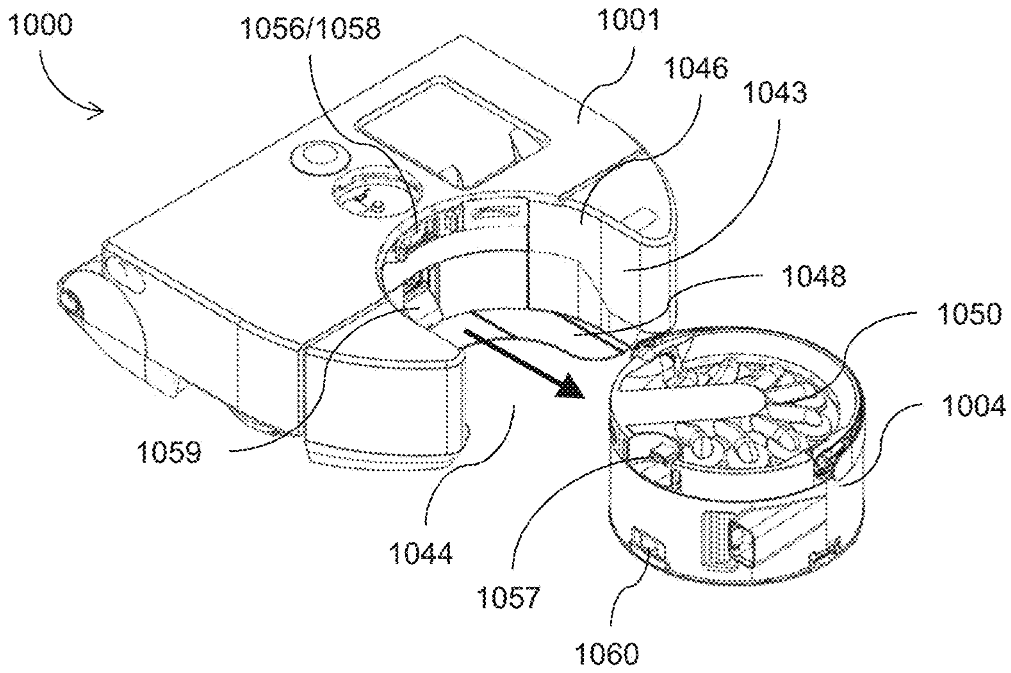
FIG. 11 is a rear perspective view of the apparatus of FIG. 1 with a receptacle separated from the body of the apparatus.

As shown in FIG. 1, when attached to the body 1001 of the apparatus 1000 the receptacle 1004 is partially disposed within a rearward facing recess 1043 defined by the body 1001. The apparatus 1000 is configured such that the receptacle 1004 can be removed from the recess 1043 by moving the receptacle 1004 in a rearwards direction relative to the body 1001 (i.e. in a direction that is substantially parallel to the longitudinal axis ($X_1$) of the apparatus 1000), as shown by the arrow in FIG. 11. Specifically, the body 1001 defines a rear opening 1044 into the recess 1043 and the body 1001 is arranged to allow the receptacle 1004 to be removed from the recess 1043 by moving the receptacle 1004 in a rearwards direction through the rear opening 1044. This arrangement of the receptacle 1004 relative to the battery charging contacts 1006 of the apparatus 1000 allows for easy removal of the receptacle 1004 when the apparatus 1000 is docked with an associated docking station, e.g. during charging of the rechargeable battery system 1005. This arrangement also provides that a portion of a side surface 1045 of the receptacle 1004 is visible when retained within the recess 1043 and that by making this visible portion at least partially transparent the fill level of the receptacle 1004 is then visible during use. In the illustrated embodiment, the receptacle 1004 is generally cylindrical and the recess 1043 has a shape that substantially corresponds with the generally cylindrical shape of the receptacle 1004. An outer wall of the generally cylindrical receptacle 1004 is then entirely transparent.

In the illustrated embodiment, the apparatus 1000 is also configured such that the receptacle 1004 can be removed from the recess 1043 by moving the receptacle 1004 in an upwards direction relative to the body 1001 (i.e. in a direction that is substantially parallel to the vertical axis ($Z_1$) of the apparatus 1000 when supported on a horizontal surface) after the receptacle 1004 has been released from the body 1001. Specifically, the body 1001 defines both the rear opening 1044 into the recess 1043 and an upper opening 1046 into the recess 1043, with the rear opening 1044 and upper opening 1046 being combined into a single opening in the illustrated embodiment.

When attached to the body 1001 a portion of the receptacle 1004 protrudes from the recess 1043 beyond the rearmost portion of the body 1001. This arrangement provides for a larger receptacle 1004 without increasing the size of the body 1001 of the apparatus 1000. A lower edge 1047 of the receptacle 1004 that is rearmost when attached to the body 1001, and that therefore protrudes beyond from the recess 1043, is then at least partially chamfered. This chamfering provides that this protruding lower edge 1047 of receptacle 1004 will not obstruct or prevent a slight rearward tilt of the apparatus 1000 that would otherwise prevent it from traversing over low objects it's in path. The body 1001 then comprises a ledge 1048 that is flush with a bottom surface of the body 1001 and that extends partially over a lower end of the recess 1043 in order to support a portion of the receptacle 1004 when the receptacle 1004 is attached to the body 1001. However, the ledge 1048 is arranged such when the receptacle 1004 is attached to the body 1001 the ledge 1048 does not extend beyond a periphery of a bottom surface of the receptacle 1004. Specifically, the ledge 1048 is arranged such that it does not extend beyond a lower corner of the chamfered lower edge 1047 when the receptacle 1004 is attached to the body 1001. The ledge 1048 therefore provides support for the receptacle 1004 when it is attached to the body 1001 without obstructing or preventing a slight rearward tilt of the apparatus 1000.

The apparatus 1000 then further comprises a retention assembly for retaining the receptacle 1004 within the recess 1043, with the retention assembly comprising a user-actuable release mechanism for releasing the receptacle 1004 from the retention assembly. In the illustrated embodiment, the retention assembly comprises a moveable upper catch 1056 provided on the body 1001 and an upper catch keeper 1057 provided on the receptacle 1004, with the upper catch keeper 1057 being arranged to be engaged by the upper catch 1056 when the receptacle 1004 is maximally disposed within the recess 1043. The moveable upper catch 1056 is arranged to be moved between a first position and a second position, and is arranged to engage the upper catch keeper 1057 when receptacle 1004 is maximally disposed within the recess 1043 with the upper catch 1056 in the first position and to disengage the upper catch keeper 1057 when in the second position. The upper catch 1056 is then biased into the first position by an upper catch spring (not shown) with the user-actuable release mechanism being provided by a receptacle release button 1058 provided on the body 1001 that is arranged, when operated by a user, to cause movement of the upper catch 1056 into the second position against the force of the upper catch spring.

In the illustrated embodiment, the retention assembly further comprises a moveable lower catch 1059 provided on the body 1001 and a lower catch 1060 keeper provided on the receptacle 1004, with the lower catch keeper 1060 being arranged to be engaged by the lower catch 1059 when the receptacle 1004 is maximally disposed within the recess 1043. As with the upper catch 1056, the lower catch 1059 is arranged to be moved between a first position and a second position, and is arranged to engage the lower catch keeper 1060 when receptacle 1004 is maximally disposed within the recess 1043 with the lower catch 1059 in the first position and to disengage the lower catch keeper 1060 when in the second position. The lower catch 1059 is biased into the first position by a lower catch spring (not shown) with the user-actuable release mechanism being arranged such that operation of the receptacle release button 1058 by a user causes both movement of the upper catch 1056 into the second position against the force of the upper catch spring and movement of the lower catch 1059 into the second position against the force of the lower catch spring. The lower catch 1059 is also arranged such that, when moved from the first position to the second position, the lower catch 1059 will push the receptacle 1004 rearward relative to the body 1001 to assist removal of the receptacle 1004. To do so, the lower catch 1059 is arranged to extend rearward from the body 1001 and into the recess 1043 when in the second position.

In an alternative embodiment, the catches 1056, 1059 and the user-actuable release mechanism of the retention assembly could be provided on the receptacle 1004 with the catch keepers 1057, 1060 then being provided on the body 1001. In such an alternative embodiment, the lower catch 1059 would then be arranged to extend forward from the receptacle 1004 when in the second position so to push the receptacle 1004 way from the body 1001 of the apparatus 1000.

The rechargeable battery system 1005 comprises a plurality of battery cells disposed at a rear of the body 1001, and that are therefore disposed at the opposite end of the body 1001 relative to the cleaning assembly 1003, so as to provide a favourable centre of gravity for the apparatus 1000. In the illustrated embodiment, the rearward facing recess 1043 defined by the body 1001 is aligned with a longitudinal axis ($X_1$) of the body 1001. The body 1001 therefore defines a first rearmost portion 1061 that extends along a first (i.e. left) side the recess 1043 and a second rearmost portion 1062 that extends along a second (i.e. right) side of the recess 1043. The first rearmost portion 1061 and the second rearmost portion 1062 therefore at least partially define the recess 1043. The rechargeable battery system 1005 then comprises a first set of battery cells 1063 disposed within the first rearmost portion 1061 and a second set of battery cells 18064 disposed within the second rearmost portion 1062. Consequently, the first set of battery cells 1063 are carried by the body 1001 on the first side of the recess 1043 and the second set of battery cells 1064 are carried by the body 1001 on the second side of the recess 1043. This arrangement provides that the battery cells 1063, 1064 are disposed at the opposite end of the apparatus 1000 to the cleaning assembly 1003 to provide some counterbalance for the weight of the cleaning assembly 1003, whilst also providing that the battery cells 1063, 1064 are distributed on either side of the longitudinal axis ($X_1$) of the apparatus to maintain a favourable centre of gravity. In the illustrated embodiment, the number of battery cells in the first set 1063 is equal to the number of battery cells in the second set 1064 so that the battery cells are evenly divided distributed on either side of the longitudinal axis ($X_1$) of the apparatus 1000.

Figure 12:
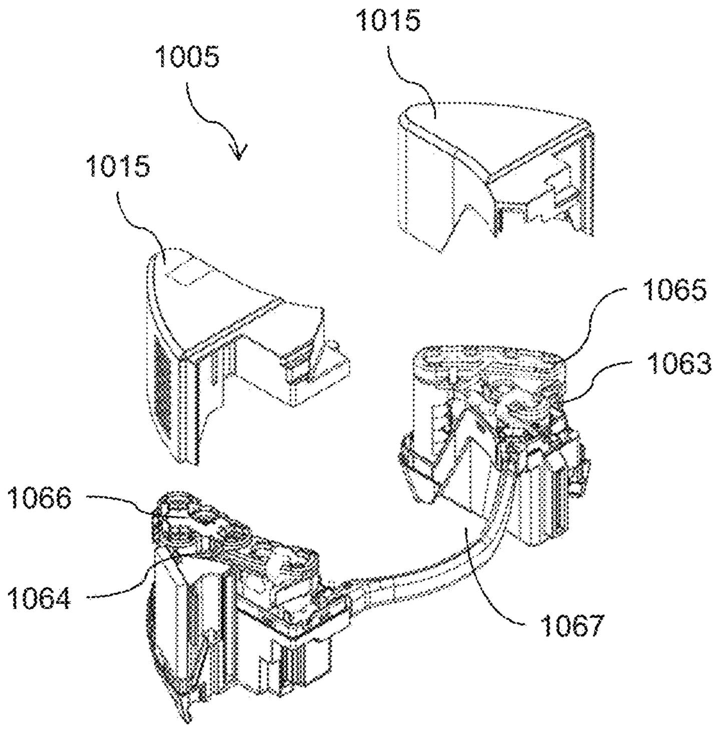
FIG. 12 is a front perspective view of a rechargeable battery system of the apparatus of FIG. 1.

As shown in FIG. 12, the battery cells in the first set of battery cells 1063 are disposed within a first battery housing 1065 that supports and provides interconnections between the battery cells in the first set of battery cells 1063, and the battery cells in the second set of battery cells 1064 are disposed within a distinct, second battery housing 1066 that supports and provides interconnections between the battery cells in the second set of battery cells 1064. The rechargeable battery system 1005 then further comprises a cable harness 1067 that extends between and connects the first battery housing 1065 and the second battery housing 1066, such that the first set of battery cells 1063 and the second set of battery cells 1064 are connected together.

Figure 13:
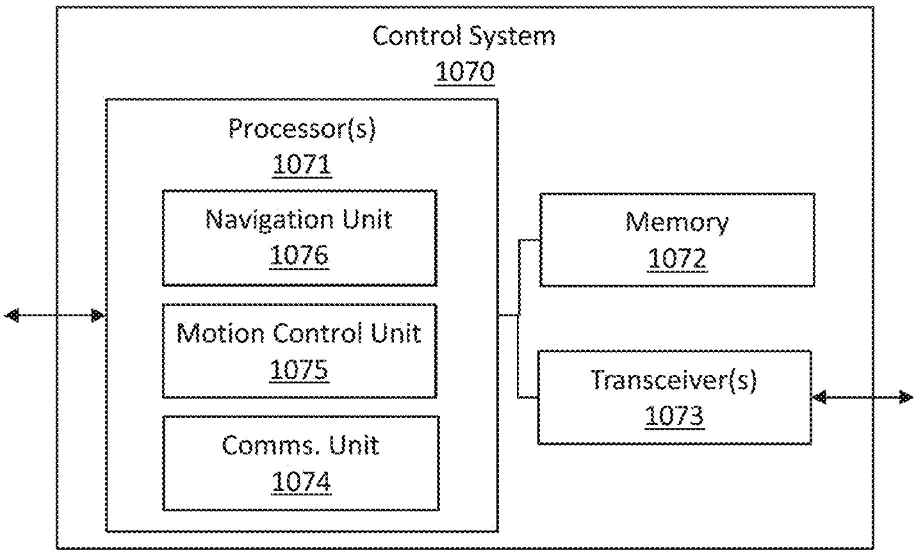
FIG. 13 is a schematic illustration of a control system of the apparatus of FIG. 1.

The apparatus 100 then further comprises a control system 1070 that is configured to control the operation of the apparatus 100, with the control system 1070 being illustrated schematically in FIG. 13. In particular, the control system 1070 is responsible for controlling the movement, navigation, cleaning operations, docking, charging, communications etc. of the apparatus 100. The control system 1070 is therefore implemented as a combination of computer hardware and software and comprises one or more processors 1071, such as microcontroller, and a memory 1072 that provides storage for any data required by the control system 1070, such as any computer programs/software applications implemented by the one or more processors 1071. The control system 1070 also comprises one or more transceivers 1073 for wireless communication with other entities such as a personal computer device (e.g. a user's smartphone, tablet computer etc.) and/or a communications interface device (e.g. a wireless access point, telecommunications base station). The control system therefore includes a communications unit 1074 that controls communications sent and received through the transceiver(s) 1073.

Amongst other operations, the control system 1070 is responsible for controlling movement of the apparatus within an environment and is therefore provided with a motion control unit 1075 that controls the drive system 1002 and a navigation unit 1076 that receives data from a navigational sensor system 1080 and uses this data to autonomously navigate the apparatus 1000 within an environment. In particular, the navigation unit 1076 is configured to use the data received from the navigational sensor system 1080 to implement functions such as localization within the environment, mapping of the environment and hazard avoidance.

In the illustrated embodiment, the navigational sensor system 1080 comprises one or more vision sensors 1081 that are arranged to capture images of the environment around the apparatus 1000, one or more motion sensors 1082 that are arranged to detect motion of the apparatus 1000, a plurality of proximity sensors 1083-1086 that are arranged to detect the presence of and/or distance to objects, a plurality of cliff sensors 1087-1092 that are arranged to detect the presence of potential drop, and a plurality of contact or bump sensors 1112, 1117, 1118 that are arranged to detect impacts between the apparatus and other objects. In the illustrated embodiment, the vision sensors 1081 comprise an omnidirectional camera, positioned at the top of the apparatus 1000, for providing the apparatus 1000 with a panoramic view of its surroundings for use in localization etc., and the motion sensors 1082 comprise an optical flow sensor directed towards the surface on which the apparatus is supported for implementing visual odometry to provide localization compensation for traction slippage etc.

As detailed above, the cleaning assembly 1003 then has a generally planar front surface 1022 and first and second (i.e. left and right) side surfaces 1023, 1024 that extend rearward from opposite ends of the front surface 1022. The cleaning assembly 1003 therefore has a first (i.e. left) front corner that is formed where the front surface 1022 meets the first side surface 1023 and a second (i.e. right) front corner that is formed where the front surface 1022 meets the second side surface 1024. The navigational sensor system 1080 then comprises a first forward proximity sensor 1083 disposed at the front surface 1022 of the cleaning assembly 1003 adjacent to the first front corner of the cleaning assembly 1003, and a second forward proximity sensor 1084 disposed at the front surface 1022 of the cleaning assembly 1003 adjacent to the second front corner of the cleaning assembly 1003. The first and second forward proximity sensors 1083, 1084 are arranged to detect obstacles that are present in the path of the cleaning assembly 1003 and the apparatus 1000. To do so, both the first and second forward proximity sensors 1083, 1084 are angled inwardly towards the longitudinal axis ($X_1$) of the cleaning assembly 1000. In particular, the first and second forward proximity sensors 1083, 1084 are directed inwardly at an acute angle ($\theta_2$) relative to the front surface 1022 of the cleaning assembly 1003. This arrangement of forward proximity sensors 1083, 1084 provides that only two proximity sensors are required in order to monitor for obstacles in the path of the apparatus 1000 and improves the sensitivity of hazard detection by ensuring that the field of view of the proximity sensors at least partially overlap.

In the illustrated embodiment, the first and second forward proximity sensors 1083, 1084 are directed inwardly at an angle ($\theta_2$) of approximately 25 degrees relative to the front surface 1022 of the cleaning assembly 1003. However, those skilled in the art will recognise that the exact angle chosen for the forward proximity sensors (02) will depend on the width of the apparatus 1000, the size of the field of view of the proximity sensors and their detection range. In the illustrated embodiment, each of the first and second forward proximity sensors 1083, 1084 are provided by a time-of-flight (TOF) sensor, such as an ultrasonic or infrared TOF sensor, and are preferably provided by an invisible infrared laser TOF sensor.

The navigational sensor system 1080 further comprises a first side proximity sensor 1085 disposed at the first side surface 1023 of cleaning assembly 1003 adjacent to the first front corner of the cleaning assembly 1003, and a second side proximity sensor 1086 disposed at the second side surface of cleaning assembly 1003 adjacent to the second front corner of the cleaning assembly 1030. The first and second side proximity sensors 1085, 1086 are directed laterally away from the apparatus 1000 and are preferably arranged such that they are directed substantially parallel to the front surface 1022 of the cleaning assembly 1003 (i.e. such that an axis of the sensor is substantially parallel to the front surface 1022 of the cleaning assembly 1003). This arrangement of side proximity sensors 1085, 1086 provides that walls or other similar obstacles are detected by the forwardmost corners of the apparatus 1000 and, when their outputs are combined with those of the forward proximity sensors 1083, 1084, allows the apparatus 1000 to accurately detect approaching corners. In the illustrated embodiment, each of the first and second side proximity sensors 1085, 1086 are provided by a time-of-flight (TOF) sensor, such as an ultrasonic or infrared TOF sensor, and are preferably provided by an invisible infrared laser TOF sensor.

In the illustrated embodiment, the navigational sensor system 1080 further comprises a first forward cliff sensor 1087 disposed at the bottom surface of cleaning assembly 1003 adjacent to the first front corner of the cleaning assembly 1003, and a second forward cliff sensor 1088 disposed at the bottom surface of cleaning assembly 103 adjacent to the second front corner of the cleaning assembly 1003. This arrangement of the forward cliff sensors 1087, 1088 ensures that potential drops are detected by the forwardmost corners of the apparatus 1000 to prevent the cleaning assembly 1003 from passing over a drop, thereby minimising the risk of the apparatus 1000 falling and avoiding wasting energy by running the vacuum motor and/or the agitator whilst over a drop.

In the illustrated embodiment, the navigational sensor system 1080 also comprises rear cliff sensors 1089, 1090 disposed adjacent to the rearmost bottom edges of the body 1001. Specifically, a first rear cliff sensor 1089 is disposed adjacent to the rearmost bottom edge of the first rearmost portion 1061 and a second rear cliff sensor 1090 is disposed adjacent to the rearmost bottom edge of the second rearmost portion 1062. These rear cliff sensors 1089, 1090 provide that potential drops are detected by the rearmost edges of the apparatus 1000 to minimise the risk that the apparatus 1000 will pass over a drop when moving in reverse. However, as these rear cliff sensors 1089, 1090 are disposed on the rearmost portions of the body 1001, these rear cliff sensors 1089, 1090 are closer to the longitudinal axis ($X_1$) of the body 1001 than the drive wheels 1016 due to inward curvature of these rearmost portions 1061, 1062 of the body 1001. The navigational sensor system 1080 therefore also comprises first and second side cliff sensors 1091, 1092 that are each disposed immediately behind and parallel with (i.e. longitudinally aligned with) a respective drive wheel 1016. These side cliff sensors 1091, 1092 are therefore directly behind each of the drive wheels 1016 in order to detect drops that may be present immediately behind the drive wheels 1016 but that may not have been detected by the rear cliff sensors 1089, 1090.

As shown in FIG. 6, the navigational sensor system 1080 of the illustrated embodiment comprises a pair of front corner sensor assemblies 1101, 1102, wherein each of these front corner sensor assemblies 1101, 1102 comprises a forward proximity sensor, a side proximity sensor and a forward cliff sensor. Specifically, the navigational sensor system 1080 comprises a first front corner sensor assembly 1101 disposed at the first (i.e. left) front corner of the cleaning assembly 1003 and a second front corner sensor assembly 1102 disposed at the second (i.e. right) front corner of the cleaning assembly 1003. The first front corner sensor assembly 1101 then includes the first forward proximity sensor 1083, the first side proximity sensor 185, and the first forward cliff sensor 187, whilst the second front corner sensor assembly 1102 includes the second forward proximity sensor 1084, the second side proximity sensor 1086, and the second forward cliff sensor 1088.

Figure 14:
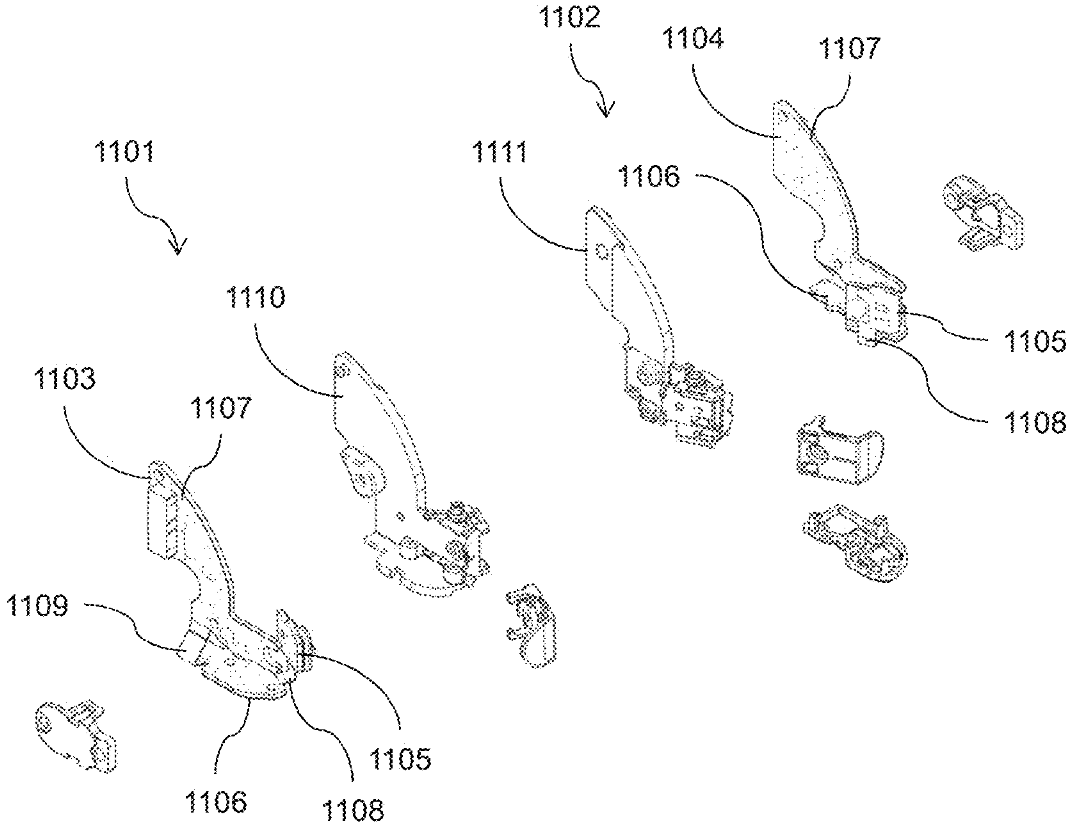
FIG. 14 is an exploded view of front corner sensor assemblies of the apparatus of FIG. 1.

As shown in FIG. 14, each of the front corner sensor assemblies 1101, 1102 comprises a single circuit board, such that the forward proximity sensor, the side proximity sensor and the forward cliff sensor of a front corner sensor assembly are all mounted to the same circuit board. Specifically, the first front corner sensor assembly 1101 comprises a first corner sensor circuit board 1103 on which the first forward proximity sensor 183, the first side proximity sensor 185, and the first forward cliff sensor 187 are all mounted, and the second front corner sensor assembly 1102 comprises a second corner sensor circuit board 1104 on which the second forward proximity sensor 1084, the second side proximity sensor 1086, and the second forward cliff sensor 1088 are all mounted. Combing three sensors onto a single circuit board simplifies the manufacture and assembly of the apparatus 1000.

The first corner sensor circuit board 1103 and the second corner sensor circuit board 1104 are both rigid-flex circuit boards. The term "rigid-flex circuit board" as used herein refers to a single circuit board that is hybrid of a flexible and rigid circuit board and that therefore comprises one or more flexible portions that provide an interconnect between rigid portions. The use of a rigid-flex circuit board simplifies the manufacture and assembly of these circuit boards as it provides that electronic components, including the individual sensors, can be mounted thereon when the circuit board is in a flat configuration with the circuit board then being subsequently reconfigured so that the sensors mounted thereon are at the required, different orientations. Each of the first corner sensor circuit board 1103 and the second corner sensor circuit board 1104 comprise a first rigid portion 1105 on which the forward proximity sensor is mounted, a second rigid portion 1106 on which the forward cliff sensor is mounted, a third rigid portion 1107 on which the side proximity sensor is mounted, a first flexible portion 1108 connecting the first rigid portion 1105 to the second rigid portion 1106, and a second flexible portion 1109 connecting the second rigid portion 1106 to the third rigid portion 1107.

The first front corner sensor assembly 1101 then further comprises a first corner circuit board frame 1110 on which the first corner sensor circuit board 1103 is mounted, with the first circuit board frame 1110 being arranged to hold the first corner sensor circuit board 1003 in a fixed configuration such that the relative positions of the sensors are fixed in the required orientations. Correspondingly, the second front corner sensor assembly 1102 comprises a second corner circuit board frame 1111 on which the second corner sensor circuit board 1104 is mounted, with the second corner circuit board frame 1111 being arranged to hold the second corner sensor circuit board 1104 in a fixed configuration such that the relative positions of the sensors mounted thereon are fixed in the required, different orientations. The first corner sensor circuit board 1103 is then mounted to the chassis 1011 of the apparatus 1000 by way of the first circuit board frame 1110, and the second corner sensor circuit board 1104 is mounted to the chassis 1011 of the apparatus 1000 by way of the second circuit board frame 1111.

As noted above, the navigational sensor system 1080 includes a plurality of contact or bump sensors that are arranged to detect impacts between the apparatus 1000 and other objects. In the illustrated embodiment, the contact sensors include a plurality of forwardmost contact sensors 1112 that are disposed behind a forward bumper 1113 that is mounted to the front surface 1022 of the cleaning assembly 1003, with each of the forwardmost contact sensors 1112 then being arranged to detect displacement of the forward bumper 1113 relative to the cleaning assembly 1003.

The forward bumper 1113 is arranged to be displaceable relative to the cleaning assembly 1003 in response to a force applied as a result of an impact on the bumper 1113. Specifically, the forward bumper 1113 comprises a plurality of rigid segments 1114 that are collectively arranged to extend laterally along the front surface 1022 of the cleaning assembly 1003, with each of the plurality of rigid segments 1114 being displaceable relative to the other of the plurality of rigid segments 1114 in response to an applied force. To do so, the plurality of rigid segments 1114 are connected by flexible joints 1115, and preferably resilient flexible joints. In the illustrated embodiment, these the flexible joints 1115 are provided by living hinges. The term "living hinge" as used herein refers to a flexible joint made from the same material as rigid parts that it joins together. A forwardmost contact sensor 1112 is then disposed beneath each of the plurality of rigid segments 1114, with each forwardmost contact sensor 1112 being arranged to detect displacement of a corresponding rigid segment 1114 of the forward bumper 1113. In the illustrated embodiment, each of the rigid segments 1114 comprises a projection 1116 that extends inwardly from the forward bumper 1113 and that is arranged to contact the respective forwardmost contact sensor 1112 when the rigid segment 1114 is displaced longitudinally towards the body 1001 of the apparatus 1000. This arrangement of the forward bumper 1113 and the forwardmost contact sensors 1112 provides that the forwardmost contact sensors 1112 can be activated independently of one another, which in turn provides that the location of an impact on the forward bumper 1113 can be accurately determined based on which of the forwardmost contact sensors 1112 are activated by the impact.

In addition to extending along the front surface 1022 of the cleaning assembly 1003 the forward bumper 1113 extends over and around the first and second front corners of the cleaning assembly 1003, and partially along both the first and second (i.e. left and right) sides 1023, 1024 of the cleaning assembly 1003. Specifically, a first (i.e. left) end rigid segment **1114*a* of the bumper 1113 extends around the first front corner of the cleaning assembly 1003 and a second (i.e. right) end rigid segment 1114*b* of the bumper 1113 extends around a second front corner of the cleaning assembly 1003. The first end rigid segment 1114*a* of the bumper 1113 is arranged to be displaced by a force applied to the first front corner of the bumper 1113 and the second end rigid segment 1114***b* of the bumper 1113 is arranged to be displaced by a force applied to the second front corner of the bumper 1113.

The contact sensors also include a first plurality of shell contact sensors 1117*a*, 1117*b* disposed behind the outer shell 1012, with each of the first plurality of shell contact sensors 1117*a*, 1117*b* being arranged to detect longitudinal displacement of the outer shell 1012 relative to the chassis 1011, and a second plurality of shell contact sensors 1118*a*, 1118*b* disposed behind the outer shell 1012, with each of the second plurality of shell contact sensors 1118*a*, 1118*b* being arranged to detect lateral displacement of the outer shell 1012 relative to both the chassis 1011 and the cleaning assembly 1003. The outer shell 1012 is therefore arranged to be displaceable relative to the chassis 1011 in both the longitudinal and lateral directions in response to a force applied as a result of an impact on the outer shell 1012. The apparatus 1000 then further comprises a first biasing assembly 1119 that is arranged to apply a restoring force to the outer shell 1012 following a rearward displacement of the outer shell 1012 in order to return the outer shell 1012 to its initial longitudinal position with respect to the chassis 1011, and a second biasing assembly 1120, 1121 that is arranged to apply a restoring force to the outer shell 1012 following a lateral displacement of the outer shell 1012 in order to return the outer shell 1012 to its initial lateral position with respect to the chassis 1011.

In the illustrated embodiment, the first plurality of shell contact sensors 1117*a*, 1117*b* are disposed behind the front surface 1007 of the outer shell 1012 and are each arranged to detect longitudinal displacement of an adjacent portion of the front surface 1007 of the outer shell 1012 toward the chassis 1011. Specifically, the first plurality of shell contact sensors comprise a first front shell contact sensor 1117*a* disposed adjacent to a first front corner of the outer shell 1012 and a second front shell contact sensor 1117*b* disposed adjacent to a second front corner of the outer shell 1012. This arrangement of shell contact sensors 1117*s*, 1117*b* behind the front corners of the outer shell 1012 provides that the location of an impact on the front of the outer shell 1012 can be determined based on which of the front shell contact sensors 1117*a*, 1117*b* are activated by the impact.

The first biasing assembly then comprises two biased arms 1119 that are rotatably mounted on respective pins (not shown) located in the right and left front corners of the chassis 1011. The pins extend vertically such that each of the arms 1119 is rotatable about a vertical axis between a biased and an actuated position. The arms 1119 extend generally inwards towards the longitudinal axis of the body 1001, with front shell contact sensors 1117*a*, 1117*b* disposed behind a distal end of the respective arm 1119. In their biased position, each arm 1119 pushes forwardly against the inside of the front surface 1007 of the outer shell 1012, holding the outer shell 1012 in its initial position forward of the chassis 1011. When an impact occurs on the front of the outer shell 1012, the outer shell 1012 is displaced rearwardly against the biasing force of a corresponding torsion spring (not shown), moving at least one of the arms 1119 to the actuated position in which the distal end of the arm 1119 activates the respective front shell contact sensors 1117*a*, 1117*b*. The arms 1119 then return to the biased position upon the removal of the longitudinally acting force, returning the outer shell 1012 to its initial position.

The second plurality of shell contact sensors 1118*a*, 1118*b* then comprise at least one shell contact sensor disposed behind the first side surface 1009 of the outer shell 1012 and at least one shell contact sensor disposed behind the second side surface 1010 of the outer shell 1012. Specifically, the second plurality of shell contact sensors comprise a first (i.e. left) side shell contact sensor 1118*a* mounted to the first side 1023 of the cleaning assembly 1003 and a second (i.e. right) side shell contact sensor 1118*b* mounted to the second side 1024 of the cleaning assembly 1003. The frontmost portions of both the first side surface 1009 and the second side surface 1010 of the outer shell 1012 then also extend forward of the front surface 1007 of the outer shell 1012 so as to cover these contact sensors provided on the sides 1023, 1024 of the cleaning assembly 1003. The first side shell contact sensor 1118*a* is therefore arranged to detect lateral displacement of the first side surface 1009 of the outer shell 1012 towards the cleaning assembly 1003, whilst the second side shell contact sensor 1118*b* is arranged to detect lateral displacement of the second side surface 1010 of the outer shell 1012 towards the cleaning assembly 1003.

In the illustrated embodiment, the second biasing assembly comprises a centering device 1120 centrally mounted towards the front of the chassis 1011 and that is biased into a laterally central position by compression springs 1021 that are disposed on either lateral side of the centering device 1020. The outer shell 1012 is then mounted to the chassis 1011 via the centering device 1120 such that the outer shell 1012 is held in a laterally central position with respect to the chassis 1011. The centering device 1020 then also functions to return the outer shell 1012 to the laterally central position following an impact that causes a lateral displacement of the outer shell 1012 from the central position.

The above described arrangements of the contact sensors allows the apparatus 1000 to accurately determine the location of a contact made by either of the frontmost portions of the apparatus 1000, i.e. by each of the cleaning assembly 1003 and the front 1007 of the outer shell 1012, whilst also enabling the detection of contacts made by the sides of the cleaning assembly 1003 and/or the body 1001 of the apparatus 1000. Furthermore, combining the outputs of the contact sensors arranged in this way allows the apparatus 1000 to more effectively determine a manoeuvre that will avoid obstacles contacted by the apparatus 1000.

It will be appreciated that individual items described above may be used on their own or in combination with other items shown in the drawings or described in the description and that items mentioned in the same passage as each other or the same drawing as each other need not be used in combination with each other. In addition, the expression "means" may be replaced by actuator or system or device as may be desirable. In addition, any reference to "comprising" or "consisting" is not intended to be limiting in any way whatsoever and the reader should interpret the description and claims accordingly.

Furthermore, although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims.

The invention claimed is:

1. An autonomous surface cleaning apparatus comprising:

a body comprising a chassis and an outer shell mounted to the chassis;

a drive system carried by the body and configured to move the autonomous surface cleaning apparatus across a surface;

a cleaning assembly disposed at a front of the body and projecting forward beyond a front surface of the outer shell, the cleaning assembly having a generally planar front surface;

a forward bumper mounted to the front surface of the cleaning assembly;

a plurality of forwardmost contact sensors disposed behind the forward bumper, each forwardmost contact sensor being arranged to detect displacement of the forward bumper relative to the cleaning assembly;

a first plurality of shell contact sensors disposed behind the outer shell, each of the first plurality of shell contact sensors being arranged to detect longitudinal displacement of the outer shell relative to the chassis; and a second plurality of shell contact sensors disposed behind the outer shell, each of the second plurality of shell contact sensors being arranged to detect lateral displacement of the outer shell relative to both the chassis and the cleaning assembly.

2. The autonomous surface cleaning apparatus as claimed in claim 1, wherein the outer shell is arranged to be displaceable relative to the chassis in the longitudinal and lateral directions of the autonomous surface cleaning apparatus in response to a force applied thereto.

3. The autonomous surface cleaning apparatus as claimed in claim 1, and further comprising a first biasing assembly arranged to apply a restoring force to the outer shell following a lateral displacement of the outer shell in order to return the outer shell to its initial lateral position with respect to the chassis.

4. The autonomous surface cleaning apparatus as claimed in claim 1, and further comprising a second biasing assembly arranged to apply a restoring force to the outer shell following a longitudinal displacement of the outer shell in order to return the outer shell to its initial longitudinal lateral position with respect to the chassis.

5. The autonomous surface cleaning apparatus as claimed in claim 1, wherein the front surface of the outer shell is disposed above the cleaning assembly.

6. The autonomous surface cleaning apparatus as claimed in claim 5, wherein the first plurality of shell contact sensors are disposed behind the front surface of the outer shell and are each arranged to detect longitudinal displacement of the front surface of the outer shell toward the chassis.

7. The autonomous surface cleaning apparatus as claimed in claim 1, wherein the first plurality of shell contact sensors comprise a front left shell contact sensor disposed adjacent to a front left corner of the outer shell and a front right shell contact sensor disposed adjacent to a front right corner of the outer shell.

8. The autonomous surface cleaning apparatus as claimed in claim 1, wherein the second plurality of shell contact sensors comprise at least one shell contact sensor disposed behind a first side surface of the outer shell and at least one shell contact sensor disposed behind a second side surface of the outer shell.

9. The autonomous surface cleaning apparatus as claimed in claim 1, wherein the second plurality of shell contact sensors comprise a first side shell contact sensor mounted to a first side of the cleaning assembly that is arranged to detect lateral displacement of the first side surface of the outer shell towards the cleaning assembly and a second side shell contact sensor mounted to a second side of the cleaning assembly that is arranged to detect lateral displacement of the second side surface of the outer shell towards the cleaning assembly.

10. The autonomous surface cleaning apparatus as claimed in claim 1, wherein the forward bumper is arranged to be displaceable relative to the cleaning assembly in response to a force applied thereto.

11. The autonomous surface cleaning apparatus as claimed in claim 10, wherein the forward bumper extends around first and second front corners of the cleaning assembly.

12. The autonomous surface cleaning apparatus as claimed in claim 1, wherein the forward bumper comprises a plurality of rigid segments collectively arranged to extend laterally along the front surface of the cleaning assembly, the forward bumper being configured such that each of the plurality of rigid segments is displaceable relative to the other of the plurality of rigid segments in response to a force applied thereto.

13. The autonomous surface cleaning apparatus as claimed in claim 12, wherein the plurality of rigid segments are connected by flexible joints, and preferably by resilient flexible joints.

14. The autonomous surface cleaning apparatus as claimed in claim 12, wherein the plurality of forwardmost contact sensors comprises a forwardmost contact sensor disposed beneath each of the plurality of rigid segments, each forwardmost contact sensor being arranged to detect displacement of a respective rigid segment of the forward bumper.

15. The autonomous surface cleaning apparatus as claimed in claim 12, wherein a first end rigid segment of the forward bumper extends around a first front corner of the cleaning assembly and is arranged to be displaced by a force applied to a first front corner of the forward bumper, and a second end rigid segment of the forward bumper extends around a second front corner of the cleaning assembly and is arranged to be displaced by a force applied to a second front corner of the front bumper.

* * * * *